United States Patent [19]

Willibald

[11] Patent Number: 5,127,589

[45] Date of Patent: Jul. 7, 1992

[54] IMPLEMENT FOR MOVING COMPOST STORED IN STACKS

[75] Inventor: Josef Willibald, Frickingen, Fed. Rep. of Germany

[73] Assignee: J. Willibald GmbH, Maschinenfabrik, Wald-Sentenhart, Fed. Rep. of Germany

[21] Appl. No.: 671,511

[22] Filed: Mar. 19, 1991

[30] Foreign Application Priority Data

Mar. 26, 1990 [DE] Fed. Rep. of Germany ....... 4009660

[51] Int. Cl.⁵ .............................................. B02C 21/02
[52] U.S. Cl. ............................. 241/101.7; 241/282.1
[58] Field of Search ........... 241/101.7, 101 A, 282.1, 241/282.2; 19/80 R, 82

[56] References Cited

U.S. PATENT DOCUMENTS

| | | | |
|---|---|---|---|
| 3,911,979 | 10/1975 | Rousseau | 144/2 N |
| 4,065,062 | 12/1977 | Heslop | 241/101.7 |
| 4,923,128 | 5/1990 | Ostrowski | 241/101.7 |

FOREIGN PATENT DOCUMENTS

| | | | |
|---|---|---|---|
| 2621689 | 11/1977 | Fed. Rep. of Germany ... 241/101.7 |
| 3641537 | 6/1988 | Fed. Rep. of Germany ... 241/101.7 |
| 3927864 | 3/1990 | Fed. Rep. of Germany ... 241/101.7 |
| 1419632 | 8/1988 | U.S.S.R. ........................... 241/101.7 |

Primary Examiner—Frank T. Yost
Assistant Examiner—John M. Husar
Attorney, Agent, or Firm—Akoo-Toren

[57] ABSTRACT

An implement for mechanically removing and laterally displacing compost or plant material to be composted which is stored in elongated stacks. The implement is used to cut strips from a stack in longitudinal direction and almost simultaneously depositing the cut material in another parallel stack which is laterally offset by at least the width of the implement. The implement includes a frame and an essentially vertically extending cutter roller which is rotatably driven about its longitudinal axis by a motor. A duct located adjacent the cutter roller extends transversely of the travel direction of the implement. An inclined conveyor forms the bottom of the duct. The implement further includes a common main drive with transmission branches to the cutter roller and the inclined conveyor.

9 Claims, 7 Drawing Sheets

IMPLEMENT FOR MOVING COMPOST STORED IN STACKS

BACKGROUND OF THE INVENTION

1. Field of the Invention

The present invention relates to an implement for removing and laterally displacing compost or plant material to be composted which is stored in elongated stacks, wherein the material is moved mechanically by means of rotating tools.

2. Description of the Related Art

All methods and implements previously known in the art operate exclusively in accordance with the principle of removing the compost material at the end face of the compost stacks and displacing the compost stacks laterally or overhead. Such an implement is described, for example, in U.S. Pat. No. 4,410,142.

However, this manner of operation has the significant disadvantage that the driver of the tractor is not only subjected to the steam and dust which inevitably is produced when moving the stacks, but the driver especially does not have an unimpaired view of the work location and, thus, the driver cannot drive precisely as required and an optimum work result cannot be achieved.

SUMMARY OF THE INVENTION

Therefore, it is the object of the present invention to eliminate the above-described disadvantages by providing a novel implement which makes possible a different manner of operation. Specifically, the above-described disadvantage of the obstruction of the view of the operator of the implement is to be eliminated.

In accordance with the present invention, an implement of the above-described type includes an essentially vertically directed cutter roller which is mounted in a frame and is rotatably driven about its longitudinal axis by a motor. A duct extending transversely to the travel direction of the implement is mounted adjacent the cutter roller. An inclined conveyor is mounted at the bottom of the duct. The implement further includes a common main drive with transmission branches to the cutter roller and to the inclined conveyor.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
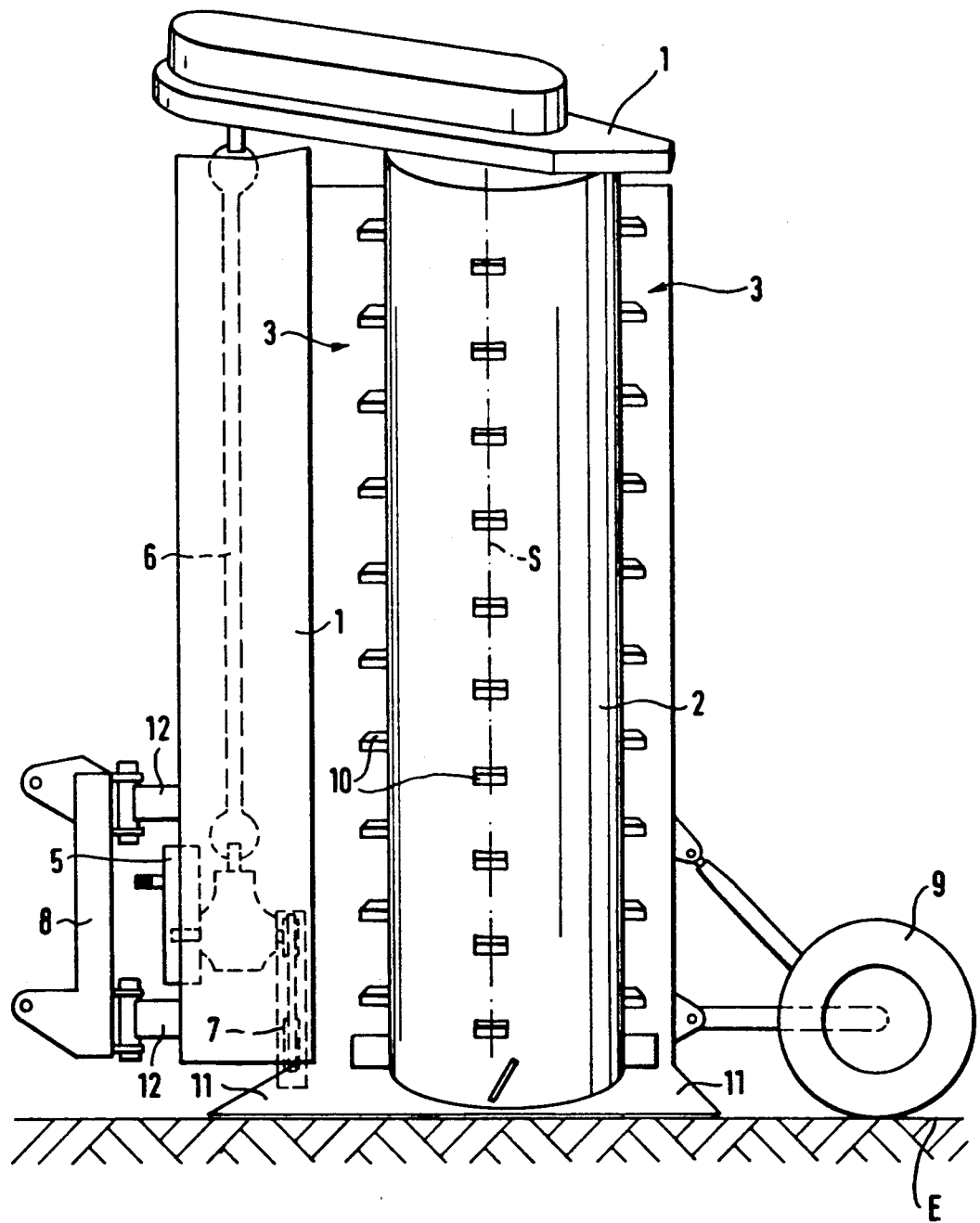
FIG. 1 is a side view of the implement according to the present invention.

The implement illustrated in the drawing is used for carrying out an operation in which strips of a stack M are cut in longitudinal direction and the cut material is almost simultaneously placed in a new stack parallel to the stack M, wherein the distance between the stacks is at least the width of the implement.

Figure 2:
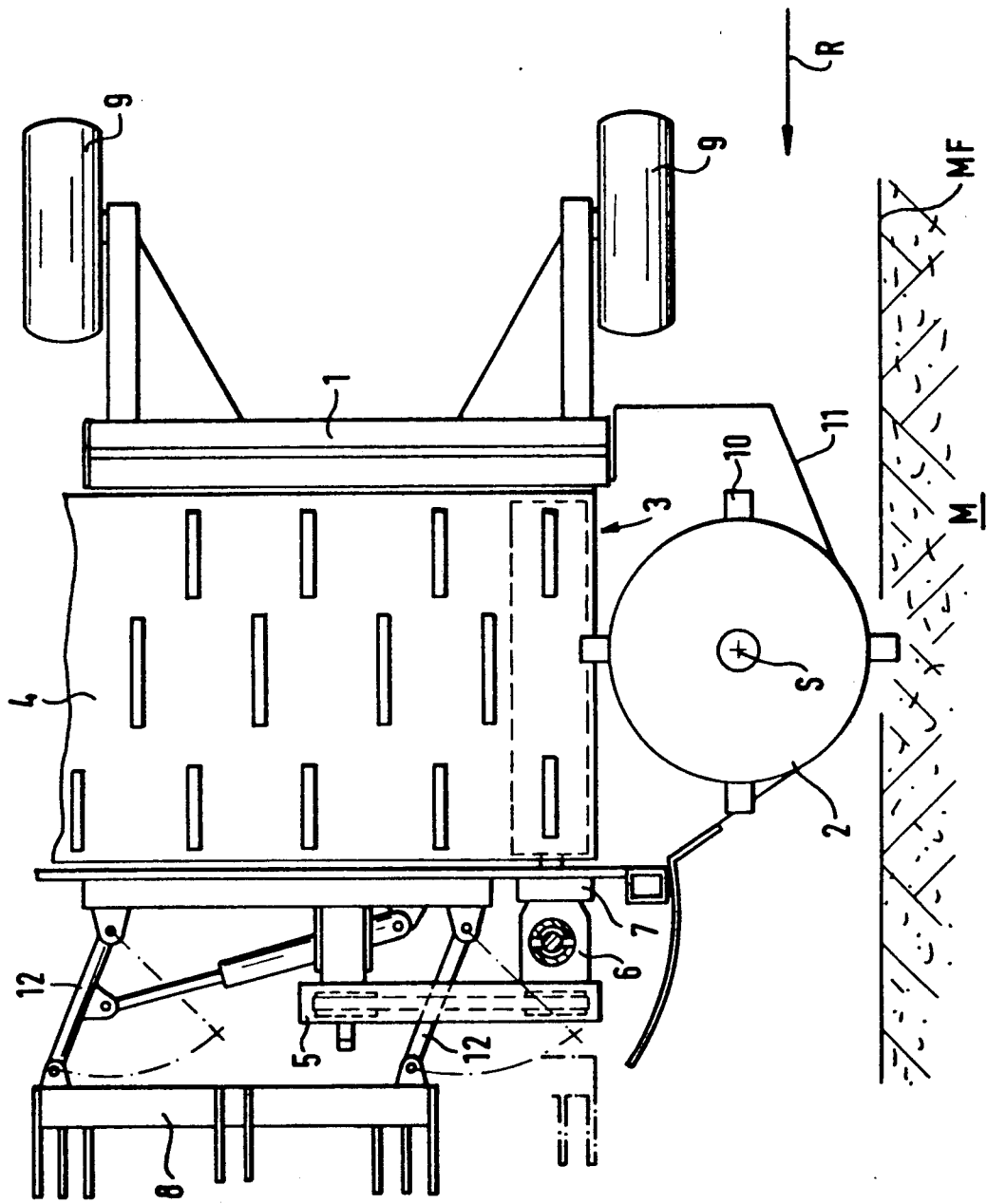
FIG. 2 is a top view of the implement of FIG. 1.
Figure 3:
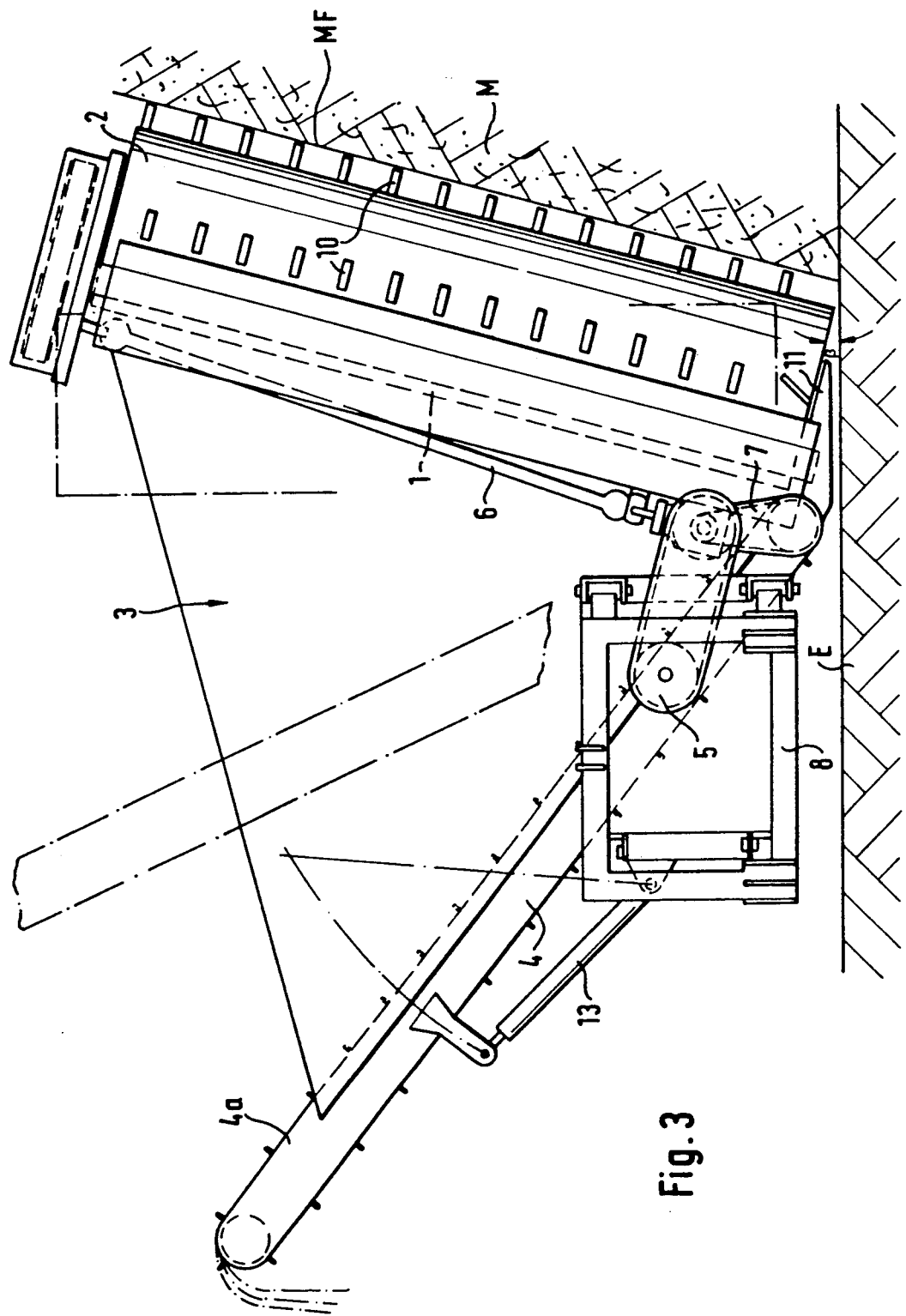
FIG. 3 is a front view, on a smaller scale, of the implement of FIGS. 1 and 2 seen in travel direction of the implement.
Figure 4:
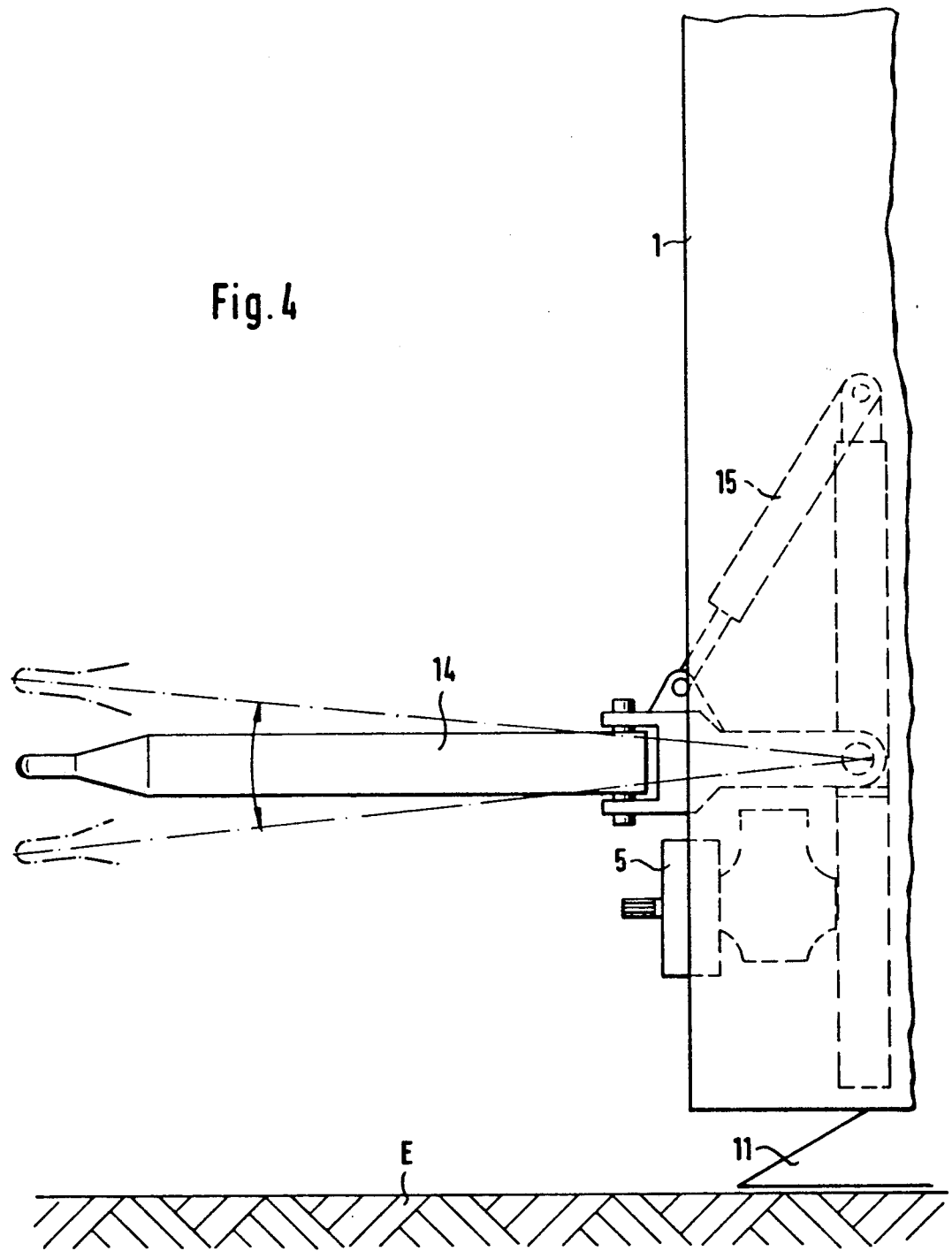
FIG. 4 is a side view of the implement according to the present invention with a draw bar.
Figure 5:
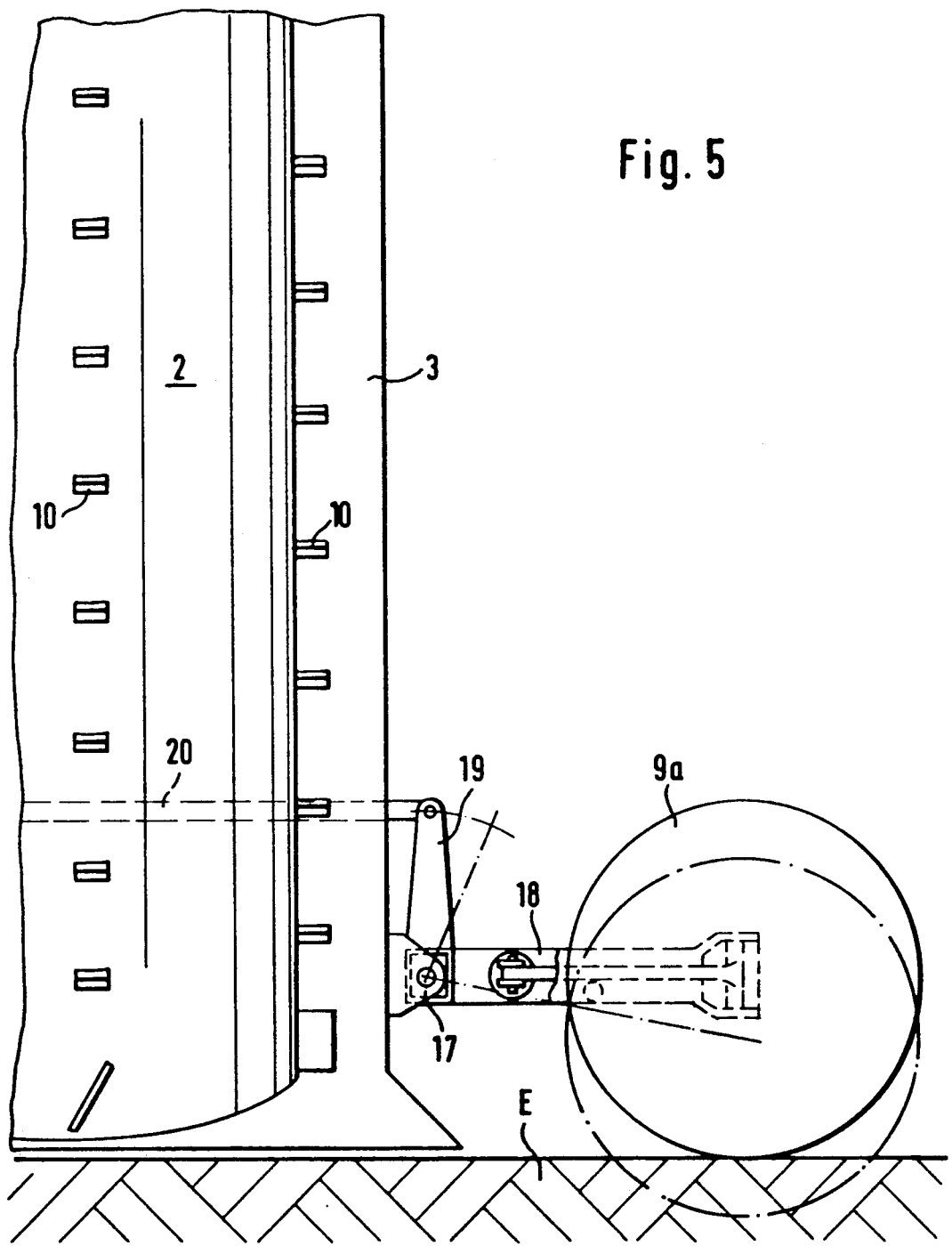
FIG. 5 is a side view of a detail of the implement of FIG. 4 including the implement wheels.
Figure 6:
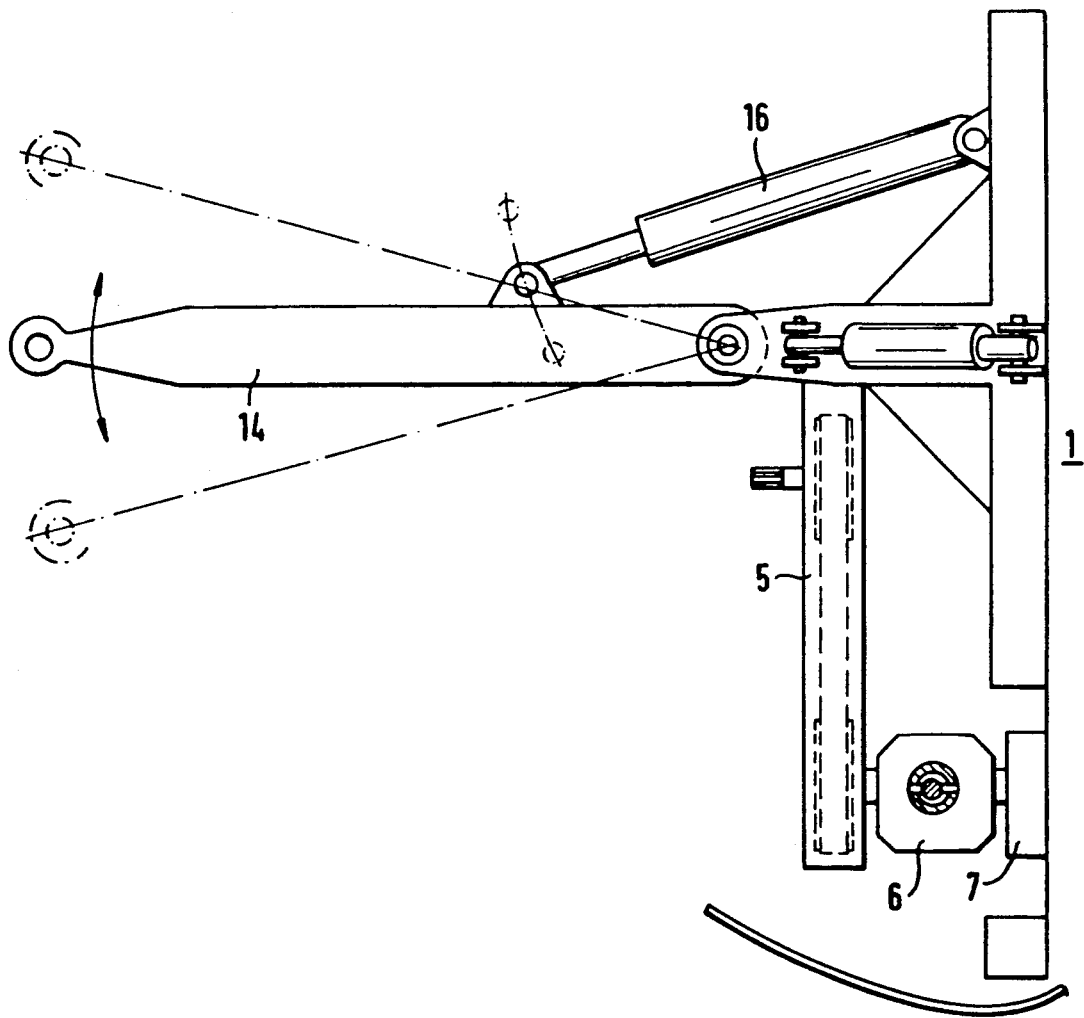
FIG. 6 is a top view of the implement of FIG. 4.
Figure 7:
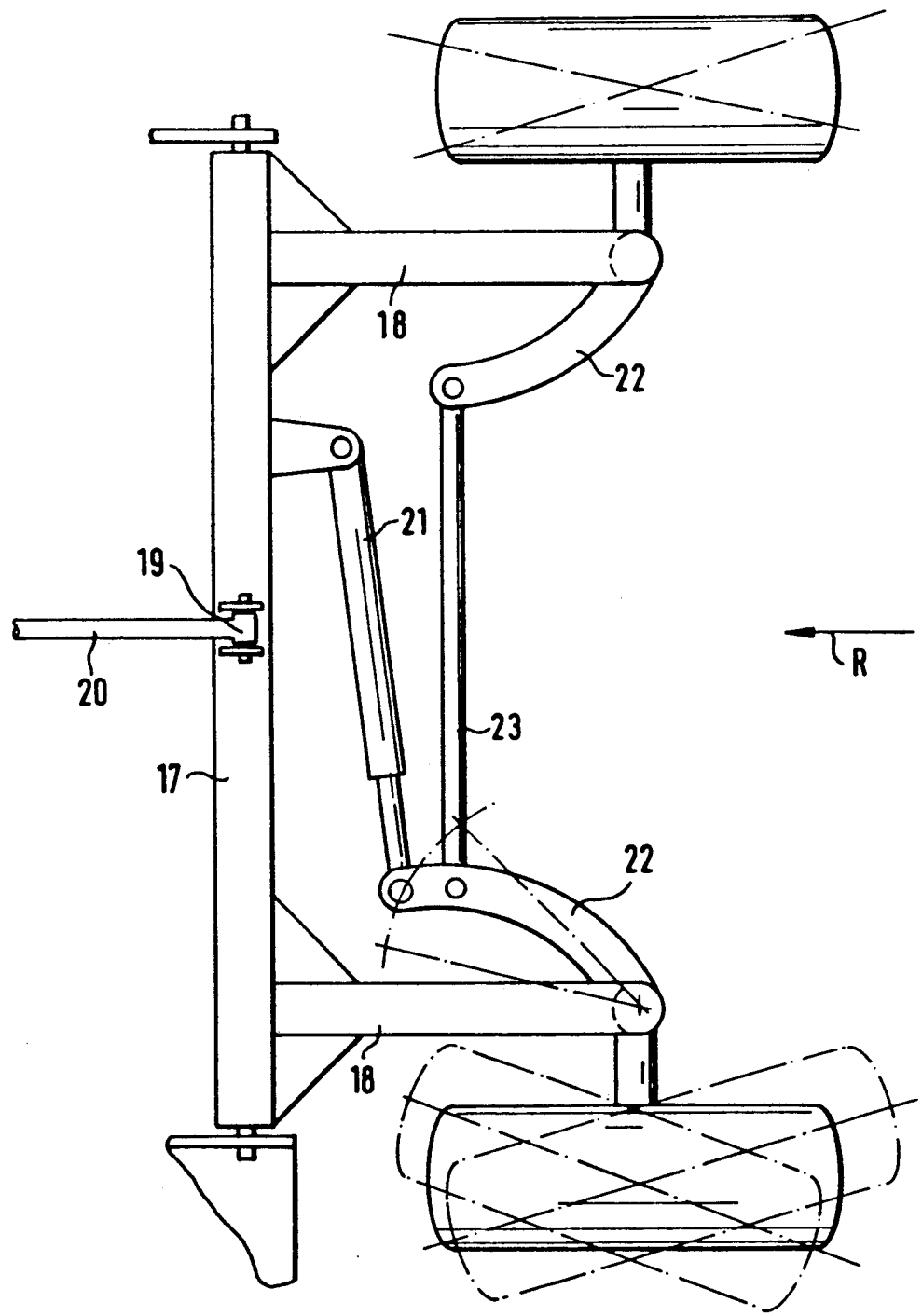
FIG. 7 is a top view of the detail of FIG. 5.

As illustrated in FIGS. 1-3 of the drawing, the implement which is mounted on or connected to a tractor or similar vehicle includes a frame 1 and an essentially vertically directed cutter roller 2 which is mounted in frame 1 and is rotatably driven about its longitudinal axis S by a motor. A duct 3 is located adjacent the cutter roller 2. Duct 3 extends transversely of the travel direction R of the implement. An inclined conveyor 4 forms the bottom of the duct 3. The implement further includes a common main drive 5 with transmission branches 6 and 7 to the cutter roller 2 and the inclined conveyor 4.

As further illustrated in FIGS. 1 and 2, the frame 1 is provided with a three-point mounted support 8 for a tractor and is additionally supported through wheels 9 or the like relative to the ground E. The mounted support 8 is connected to the frame 1 through a parallelogram linkage 12. Simultaneously, for example, for travel on roads, the cutter roller 2 and the inclined conveyor 4 are mounted on the frame 1 so as to be pivotable toward each other.

In accordance with another special structural feature of the operating components of the implement according to the present invention, the cutter roller 2 is provided on the circumference thereof with knife-like conveyor prongs 10. The cutter roller 2 is inclined relative to the ground E and relative to the stack side $M_F$ by an angle $\beta$. In the transition to the duct 3 and/or inclined conveyor 4, the cutter roller 2 is provided with a guide plate 11 or a similar inclined member for the compost material. At the discharge end 4a, the inclined conveyor 4 projects out of the duct 3. The inclined conveyor 4 can be raised and lowered by means of a hydraulic device 13.

The implement according to the present invention shown in FIGS. 4-7 is provided, instead of the three-point mounted support 8, with a drawbar 14 which can be adjusted vertically and horizontally and with appropriate hydraulic adjusting cylinders 15, 16 between the drawbar 14 and the frame 1.

The structural feature of the implement according to the present invention shown in FIGS. 4-7 makes it possible that the wheels 9a which support the frame are vertically adjustable for travel on the road and that the angle relative to the travel direction R of the wheels 9a is adjustable during operation.

On the one hand, this makes it possible that the implement can travel tight turns between the stacks and, on the other hand, the cutting pressure on the machine is compensated when the wheels are turned during operation toward the stack M.

In accordance with another structural feature of the hitching elements, it is provided that an angular shaft 18, 19 which is pivotally mounted on the frame 1 about a horizontal axis 17 serves for the vertical adjustability of each of the wheels 9, 9a. The free leg 19 of the shaft 18, 19 is coupled through a push rod 20 to the vertical adjusting cylinder 15 of the drawbar 14.

In accordance with a further feature, the horizontal adjusting cylinder 16 of the drawbar 14 and the cylinder 21 for the wheels 9a are controllable simultaneously and the horizontally pivotable stub axles 22 of the wheels 9a are positively connected to each other through a connecting rod 23 so that the stub axles 22 move together. Instead of the angular shaft 18, 19, it is also possible to provide for each side a vertically movable parallelogram linkage (not shown) mounted on the rearward side of the frame 1 to provide the vertical adjustability of the steerable wheels 9a.

While a specific embodiment of the invention has been shown and described in detail to illustrate the application of the inventive principle, it will be understood that the invention may be embodied otherwise without departing from such principles.

I claim:

1. In an implement for mechanically removing and laterally displacing compost or plant material to be composted which is stored in longitudinal stacks, the improvement comprising a frame, an essentially vertically extending cutter roller mounted in the frame, the cutter roller having a longitudinal axis, a motor for rotatably driving the cutter roller about the longitudinal axis thereof, a duct having a bottom mounted adjacent the cutter roller, the duct extending transversely of a travel direction of the implement, an inclined conveyor forming the bottom of the duct, wherein the cutter roller has on the circumference thereof knife-like conveyor prongs, the cutter roller being inclined relative to the ground and relative to a stack side, the cutter roller further including a guide plate, the guide plate being mounted at an end of the cutter roller forming a transition to the duct and the inclined conveyor, and a common main drive with transmission branches to the cutter roller and the inclined conveyor.

2. The implement according to claim 1, wherein the frame comprises a three-point mounted support adapted for connection to a tractor, and wherein the frame further includes wheels for supporting the frame relative to the ground.

3. The implement according to claim 2, comprising a parallelogram linkage for connecting the three-point mounted support to the frame, the cutter roller and the inclined conveyor being mounted on the frame so as to be pivotable toward each other.

4. The implement according to claim 1, wherein the inclined conveyor has a discharge end, the discharge end of the inclined conveyor projecting out of the ducts, the implement further comprising hydraulic means for pivoting the inclined conveyor.

5. The implement according to claim 1, wherein the frame includes a vertically and horizontally adjustable drawbar and hydraulic adjusting cylinders extending between the drawbar and the frame.

6. The implement according to claim 2, wherein the wheels supporting the frame are vertically adjustable by means of a parallelogram linkage.

7. The implement according to claim 5, the implement being supported relative to the ground by means of wheels, the implement comprising an angular shaft pivotally mounted on the frame for vertically adjusting each wheel, the angular shaft having a free leg, the free leg being coupled to the hydraulic adjusting cylinder for vertically adjusting the drawbar.

8. The implement according to claim 7, further comprising an additional hydraulic cylinder each for adjusting the angle of the wheels relative to the travel direction.

9. The implement according to claim 8, comprising means for simultaneously steering the hydraulic adjusting cylinder for horizontally adjusting the drawbar and the additional hydraulic cylinders for the wheels, the wheels including pivotable stub axles, the stub axles being positively connected to each other through a connecting rod such that the stub axles move together.

* * * * *